US011303690B1

(12) United States Patent
Bhattacharyya et al.

(10) Patent No.: US 11,303,690 B1
(45) Date of Patent: Apr. 12, 2022

(54) METHOD AND SYSTEM FOR ENHANCING QUALITY OF EXPERIENCE (QOE) OF VIDEO RECEPTION AT RECEIVER

(71) Applicant: Tata Consultancy Services Limited, Mumbai (IN)

(72) Inventors: Abhijan Bhattacharyya, Kolkata (IN); Madhurima Ganguly, Kolkata (IN); Ashis Sau, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 17/194,383

(22) Filed: Mar. 8, 2021

(51) Int. Cl.
*H04L 29/06* (2006.01)
*H04L 12/805* (2013.01)
*H04L 65/80* (2022.01)
*H04N 21/442* (2011.01)
*H04N 21/2187* (2011.01)
*H04L 47/36* (2022.01)
*H04L 69/22* (2022.01)
*H04N 21/47* (2011.01)
*H04L 69/329* (2022.01)

(52) U.S. Cl.
CPC ............ *H04L 65/80* (2013.01); *H04L 47/36* (2013.01); *H04L 69/22* (2013.01); *H04L 69/329* (2013.01); *H04N 21/2187* (2013.01); *H04N 21/442* (2013.01); *H04N 21/47* (2013.01)

(58) Field of Classification Search
CPC ....... H04L 47/36; H04L 69/22; H04L 69/329; H04N 21/2187; H04N 21/442; H04N 21/47
USPC ......................................................... 725/139
See application file for complete search history.

(56) References Cited

U.S. PATENT DOCUMENTS

| 10,419,502 B2 * | 9/2019 | Bao ........................ H04L 47/30 |
| 2015/0350287 A1 * | 12/2015 | Novo Diaz ............. H04L 67/42 709/203 |
| 2019/0253475 A1 * | 8/2019 | Bhattacharyya ........ H04L 65/80 |

FOREIGN PATENT DOCUMENTS

KR       10-0641159        11/2006

OTHER PUBLICATIONS

Lin et al., "The Packet Loss Effect on MPEG Video Transmission in Wireless Networks," Proceedings of the 20th International Conference on Advanced Information Networking and Applications (2006).

\* cited by examiner

*Primary Examiner* — Nnenna N Ekpo
(74) *Attorney, Agent, or Firm* — Finnegan, Henderson, Farabow, Garrett & Dunner, LLP (57) ABSTRACT

This disclosure relates generally to method and system for enhancing Quality of experience (QoE) for rendering live interactive videos in real-time. The conventional methods utilize an additional field in packet header to determine which packet sequences were lost, so that the receiver could request a retransmission. Due to unpredictable delay and loss, the receiver may not get the end-of-frame packet which has been sent using best-effort. The disclosed method and system introduced an additional indicator to identify an expected maximum number of packets transmitted for each frame, and further determine the distribution of loss so that the rendering unit can intelligently decide on whether to allow the frame to display, or to drop it without using any additional retransmission or error-concealment strategy, thereby enhancing the QoE of reception at the receiver.

9 Claims, 7 Drawing Sheets

METHOD AND SYSTEM FOR ENHANCING QUALITY OF EXPERIENCE (QOE) OF VIDEO RECEPTION AT RECEIVER

PRIORITY CLAIM

This U.S. patent application claims priority under 35 U.S.C. § 119 to: India Application No. 202121000293, filed on 4 Jan. 2021. The entire contents of the aforementioned application are incorporated herein by reference.

TECHNICAL FIELD

The disclosure herein generally relates to media streaming, and, more particularly, to method and system for enhancing quality of experience (QoE) of vide reception at a receiver by rendering decision in a delay-sensitive streaming of live interactive videos.

BACKGROUND

The perceived quality of service (QoS) of the video-feed plays a critical role in maintaining the overall quality of experience (QoE) of delay-sensitive interactive systems. For example, in a typical tele-robotics system, the kinematic control commands are emanated by the remote operator as a reaction to the information inferred from the video feed from the robot-end. Such systems are bound by strict latency requirements such that the temporal relationship between the events happening at the remote scenes is maintained at the rendering unit of the operator across frames consistently. Packet losses caused by impairments in the channel, especially by a poor last-mile, lead to degradation of the frame quality and may result in frame drop causing lack of coherence between the remote scene and the operator screen.

It is an established convention that Peak Signal to Noise Ratio (PSNR) has direct impact on perceived quality. So, conventional systems try to reduce the effect of loss on visual experience through attempts to enhance the PSNR by regaining lost packets using Backward Error Correction (BEC) or Forward Error Correction (FEC). However, such schemes eventually lead to increased latency penalty due to communication and computation overhead. Thus, both of these methods eventually would be susceptible to frame drop, thereby eventually causing degradation in quality.

SUMMARY

Embodiments of the present disclosure present technological improvements as solutions to one or more of the above-mentioned technical problems recognized by the inventors in conventional systems. For example, in one embodiment, a method for enhancing Quality of experience (QoE) of video reception at a receiver is provided. The method includes receiving, from a transmitter, a signal comprising a plurality of frames associated with a live interactive video stream, each frame of the plurality of frames comprising a set of packets, via one or more hardware processors. Further, the method includes determining, in a frame from amongst the plurality of frames, a position of a set of non-critical packets from amongst the set of packets lost during the receiving of the signal, via the one or more hardware processors, wherein the position of the set of non-critical packets is indicative of a spatial distribution of loss at a play-out deadline associated with the received signal. Furthermore, the method includes determining whether to render the frame based on the determination of the position of the set of non-critical packets lost, via the one or more hardware processors.

In another aspect, a system for enhancing Quality of experience (QoE) of video reception at a receiver is provided. The system includes a memory storing instructions, one or more communication interfaces and one or more hardware processors coupled to the memory via the one or more communication interfaces, wherein the one or more hardware processors are configured by the instructions to receive, from a transmitter, a signal comprising a plurality of frames associated with a live interactive video stream, each frame of the plurality of frames comprising a set of packets. The one or more hardware processors are configured by the instructions to determine, in a frame from amongst the plurality of frames, a position of a set of non-critical packets from amongst the set of packets lost during the receiving of the signal, wherein the position of the set of non-critical packets is indicative of a spatial distribution of loss at a play-out deadline associated with the received signal. Furthermore, the one or more hardware processors are configured by the instructions to determine whether to render the frame based on the determination of the position of the set of non-critical packets lost.

In yet another aspect, a non-transitory computer readable medium for a method for enhancing Quality of experience (QoE) of video reception at a receiver is provided. The method includes receiving, from a transmitter, a signal comprising a plurality of frames associated with a live interactive video stream, each frame of the plurality of frames comprising a set of packets, via one or more hardware processors. Further, the method includes determining, in a frame from amongst the plurality of frames, a position of a set of non-critical packets from amongst the set of packets lost during the receiving of the signal, via the one or more hardware processors, wherein the position of the set of non-critical packets is indicative of a spatial distribution of loss at a play-out deadline associated with the received signal. Furthermore, the method includes determining whether to render the frame based on the determination of the position of the set of non-critical packets lost, via the one or more hardware processors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

The live (or real-time) interactive video streaming has application in various upcoming applications, including, but not limited to, augmented Reality (AR) applications such as tele-presence and tele-operation applications. Such applications demand the visual content to be received not only with a good quality but also in real time, to meet Quality of Experience (QoE). Said applications, especially that are time critical or delay critical such as tele-medicine, search and rescue operations, and so on, more stringently bestows the QoE on the end-to-end latency than normal AR applications. Additionally, said applications consider the quality of visual content received in the real time, as critical information for taking next course of action. But a capability to maintain the QoE is important.

Figure 1:
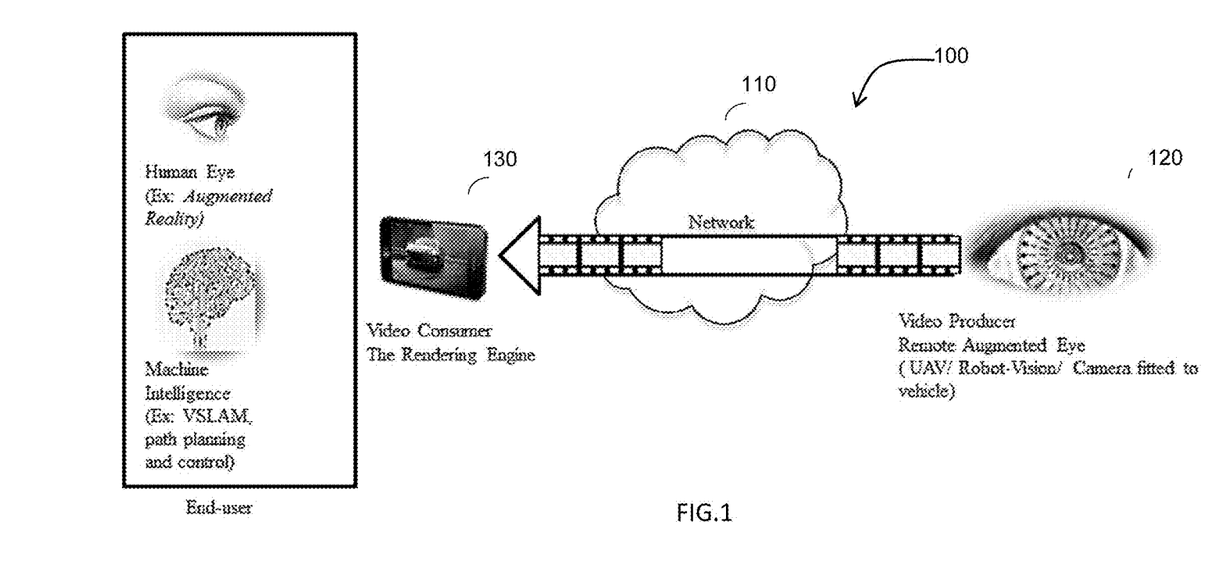
FIG. 1 illustrates an exemplary application scenario for methods and systems of the present disclosure.

FIG. 1 illustrates an exemplary application scenario for systems and methods of the present disclosure. An end-point producing video or video producer 120 may be a constrained device considering the balance between the amount of service that needs to be provided and the amount of energy, memory and processing power that may be available. The video producer 120 may transmit media over a network 110 to a receiver or a video rendering engine or video consumer 130. Furthermore, the video producer 120 may have to move around in an environment with lossy connectivity marred with frequently intermittent connection. The intermittence may occur both in indoor or in outdoor conditions due to radio impairments through shadowing, destructive interference, etc. and also due to congestion in network. Importantly, an end user of the video may no longer be the human eye; rather it can be some machine intelligence algorithm. Hence, the video gets truly communicated from Thing to Thing.

The Quality of Experience (QoE) considerations of a video rendering unit (video consumer) for applications like Augmented Reality (AR), Visual Simultaneous Localization and Mapping (VSLAM), surveillance using Unmanned Aerial Vehicles (UAV) are also different from traditional applications. While human eye may be insensitive to few milliseconds of deviation in play-out time, machine algorithms may not. Again, while a human brain may tolerate a video freeze for certain duration, a freeze for the same duration may prove catastrophic for machine algorithms like visual VSLAM.

The conventional systems deal with user perception entangled with PSNR of the received frames. Conventionally, loss-recovery and concealment is largely dealt with techniques involving Backward Error Correction (BEC) through Automatic Repeat Request (ARQ) or by application-layer FEC (AL-FEC). However, both the mechanism trades off latency and bandwidth. AL-FEC is usually deployed with best effort real-time transmission on RTP. ARQ based schemes become inefficient with increasing loss and is also not scalable for multicast environment. However, FEC overhead at the decoder and the required frame accumulation length shoots the latency. Use of FEC was proposed in QUIC, but that does not improve the performance and has been removed since 2016 and, in general, video on QUIC seems to perform poorer than TCP.

The popular technologies for video streaming over the Internet have used ARQ with adaptive bit rate (ABR) which adapts the video bit-rate by changing the compression ratio as a response to the instantaneous channel condition. However, though ABR tries to satisfy the network QoS, it severely undermines the QoE which should be the actual concern for the end-user experience. Also, for delay-critical use cases the reaction time for adaptation must be very quick for changing channel conditions. While these solutions are good for video on demand, they are not effective for delay-critical interactive applications. A known technique proposes a network coding-based retransmission scheme to mitigate the last mile impairments in home WiFi situation for IPTV delivery. However, this does not deal with delay-sensitive situations and trades off latency like the previously mentioned ARQ based scheme.

Another known technique enhances CoAP to alleviate poor latency for streaming in constrained IoT. But does not specify actual mechanism of loss-compensation. Yet another known method includes use of Selective Reliable RTP (SR-RTP) by using the Real-time Transport Control Protocol (RTCP) protocol for retransmission of lost frames in an Application Data Unit (ADU). However, it is observed that retransmission for I-frames may not be feasible when the transient loss and channel delay is prohibitively high. So, it attempts to reduce error-propagation due to loss of packets by partial recovery. However, it was observed that replacing missing macro-block with that of previous frame does not work well. Hence, it proposed partial recovery through receiver end post-processing by a complex method to reconstruct important missing data in reference frame using the motion vectors and texture of surrounding frames. It claims to send retransmission requests for the lost packets in each frame by introducing new header field of 4 bytes to indicate the number of total packets in the frame. This field may be accompanied with each packet containing the information fragment in the frame. The additional field helps in determining which packet sequences were lost, so that the receiver may request a retransmission. It is to be noted that due to unpredictable delay and loss, the receiver may not get the end-of-frame packet which has been sent using best-effort. Making the end-of-frame packet a critical one as well (along with the meta-data) and sending reliably may ruin the throughput and degrade the QoE. Hence, an additional indicator may be required to identify the expected maximum number of packets. However, the way SR-RTP does this is indeed wastage of bandwidth.

Additionally, the retransmission of the lost packets in a frame may not yield desired QoE in case of extremely delay-sensitive real-time interactive applications like tele-robotics under a lossy burst in the end-to-end channel state. In such a situation, retransmission of lost frames may lead to missing a strict play-out deadline, thereby eventual loss of the packet despite retransmission. This may lead to increased video freezing at the receiver, thereby jeopardizing the overall interactive operation.

Applicant in the Indian patent application number 201821005659 (titled ADAPTIVE RESTful REAL-TIME LIVE MEDIA STREAMING), partially addressed to achieve the QoE, by using an Adaptive RESTful Real-time Live Streaming for Things (here after referred as A-REaLiST) as an application protocol to carry the video stream. The A-REaLiST tries to maintain a balance between a reliability and a real-time delivery. The A-REaLiST infer criticality of the information segment on the fly and delivers that information segment through reliable or unreliable (best-effort) semantics for critical and non-critical information segments respectively. For a given fi there may be a higher probability (PR) of receiving the critical information segments fi_crit. Similarly, there may be much a lower probability (PL) of receiving the non-critical information segments fi_non-crit due to best effort delivery under lossy conditions arising out of packet loss or jitter in the end-to-end transmission channel. A naïve reconstruction technique provided in the A-REaLiST may not take care of this packet loss and may not take associate actions while rendering before the play-out. It has been observed that even if a non-critical packet is lost in the frame, the small loss heavily ruins the visual quality of experience. The usual practice is to drop the frame and repeat the previous good frame (leading to video freeze). Hence maintaining the QoE is still the challenging aspect.

A-REaLiST proposes to intelligently switch between reliable and best-effort semantics inferring the criticality of the segments in flight. It builds on Constrained RESTful Application Protocol (CoAP). The A-REaLiST maintains real-time video play-out deadlines through best effort transfer, it also ensures delivery of critical segments (header information, important metadata, etc.) which may enable an end-application to perform in situ corrections of any impairment due to potential loss of data. However, it does not provide any specific mechanism of to effectively mitigate the effect of loss of noncritical segments. Particularly, while A-REaLiST facilitates in sending meta-data reliably, does not discuss how to handle loss of non-critical information. It assumes that an intelligent rendering application may be able to leverage the critically received meta data along with the partially received non-critical data to conceal the loss.

A-REaLiST introduces certain header fields in Constrained Application Protocol (CoAP). CoAP has two distinct modes: Confirmable (CON) and Non-confirmable (NON). A CON message attempts reliable delivery with application-layer ARQ and RESTful request/response exchange. A-REaLiST introduced three header options to existing set of headers in CoAP to facilitate streaming:

1) Stream_info maintains the stream identity and indicates the present phase of exchange. It consumes one unsigned byte. It maintains the stream identity and indicates the present phase of exchange. It is both request and response option. It has two fields. The 3-LSBs indicate the state of exchange (Stream_state) and 5-MSBs indicate an identifier (Stream_id) for the stream. The identifier remains unchanged for the entire stream. Interpretation of Stream_state bits are:
   a. 000=>stream initiation (always with request),
   b. 001=>initiation accepted (always with response),
   c. 010=>initiation rejected (always with response),
   d. 011=>stream re-negotiation (with request or response),
   e. 100=>stream ongoing.
2) Time-stamp is a 32-bit unsigned integer. It consumes 32-bit unsigned integer. It is a request option. It relates a particular application data segment to the corresponding frame in the play sequence.
3) Position is a 16-bit unsigned integer for spatial ordering of segments in a frame. It is a request option. It is a combination of two fields. The 15-MSBs indicate the "offset" at which the present segment is placed in the frame corresponding to the given timestamp. The LSB indicates if the current segment is the last segment of the frame corresponding to the given timestamp.

However, for MJPEG transmission, the first packet from each JPEG frame contains critical information in the form of JPEG header meta-data. This packet is transmitted reliably in blocking fashion (stop-and-wait). Unless the reception of the packet is confirmed through ACK from receiver, no non-critical packet is transmitted. If the packet reception is not confirmed within the ACK time-out then the whole frame is dropped. So, offset value zero has not much significance. Additionally, the JPEG frames themselves carry the End-of-Image (EoI) marker. So, the last-segment indicator (last-bit) in the Position field is also redundant.

The protocol of the present disclosure provides a modification of A-REaLiST. The present disclosure herein provides methods and systems that solves the technical problem of maintaining the QoE in the real-time (or live) interactive video streaming without additional bandwidth and without degrading the latency. The present disclosure provides an effective rendering mechanism at the video consuming unit 130 to increase the possibility of rendering a frame (of live interactive video) by estimating the impact of the lost packets during transmission. In an embodiment, the disclosed method includes an efficient mechanism to estimate an expected number of packets and determine the distribution of loss so as to intelligently decide on whether to allow the frame to display, or to drop it without using any additional retransmission or error-concealment strategy. The proposed method and system thus facilitate in increasing the QoE for the real-time interactive video reception, as will be further descried in the description below (FIGS. 2-7).

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIGS. 2 through 7, where similar reference characters denote corresponding features consistently throughout the figures, there are shown preferred embodiments and these embodiments are described in the context of the following exemplary system and/or method.

In the context of the present disclosure, the expression 'media' may refer to video, audio, animation, images or a combination of different content forms referred generally as multimedia. Although further description of the present disclosure may refer to 'video' streaming, it may be noted that the described application is non-limiting and systems and methods of the present disclosure may be generally applied to other 'media' as well. Furthermore, the expressions 'video producer' and 'producer' may be used interchangeably. Likewise, the expressions 'video consumer' and 'consumer' may be used interchangeably.

The present disclosure is particularly directed to real-time delay sensitive live streaming protocol for remote vision over Internet which can be used by constrained devices. In case of typical delay-sensitive interactive operations, perception of quality should be quite different than video on demand (VoD) or normal broadcast services. Particularly, regaining the structural integrity of the frame that has undergone a packet-loss should be the target. The disclosed embodiments present method and system to ensure improved perception in the face of practical last-mile impairment without spending resources on improve the PSNR.

Figure 2:
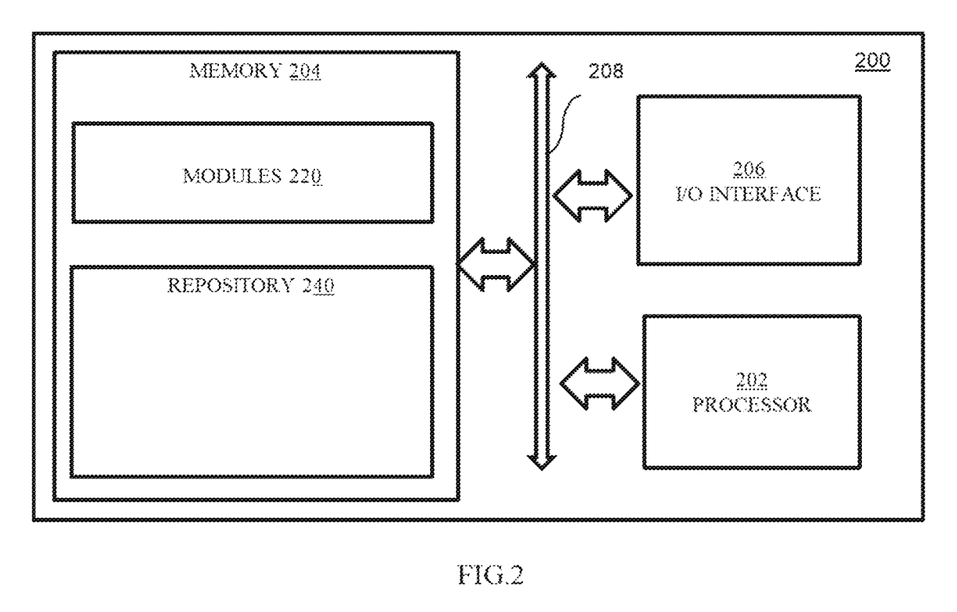
FIG. 2 is a functional block diagram of a system for enhancing QoE of video reception at a receiver, according to some embodiments of the present disclosure.

FIG. 2 illustrates an exemplary block diagram of a system 200 for enhancing QoE of video reception at receiver (or video consumer 130, FIG. 1), in accordance with an embodiment of the present disclosure. In an embodiment, the system 200 includes one or more processors 204, communication interface device(s) or input/output (I/O) interface(s) 206, and one or more data storage devices or memory 202 operatively coupled to the one or more processors 204. The one or more processors 204 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 200 can be implemented in a variety of computing systems, such as laptop computers, notebooks, hand-held devices, workstations, mainframe computers, servers, a network cloud and the like.

The I/O interface device(s) 206 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the 1/O interface device(s) can include one or more ports for connecting a number of devices to one another or to another server.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 200 can be stored in the memory 202.

In an embodiment, the system 200 includes one or more data storage devices or memory 202 operatively coupled to the one or more processors 204 and is configured to store instructions configured for execution of steps of the method 200 by the one or more processors 204. In an embodiment, the one or more processors may be implemented in the video consumer 130 (FIG. 1).

Figure 3:
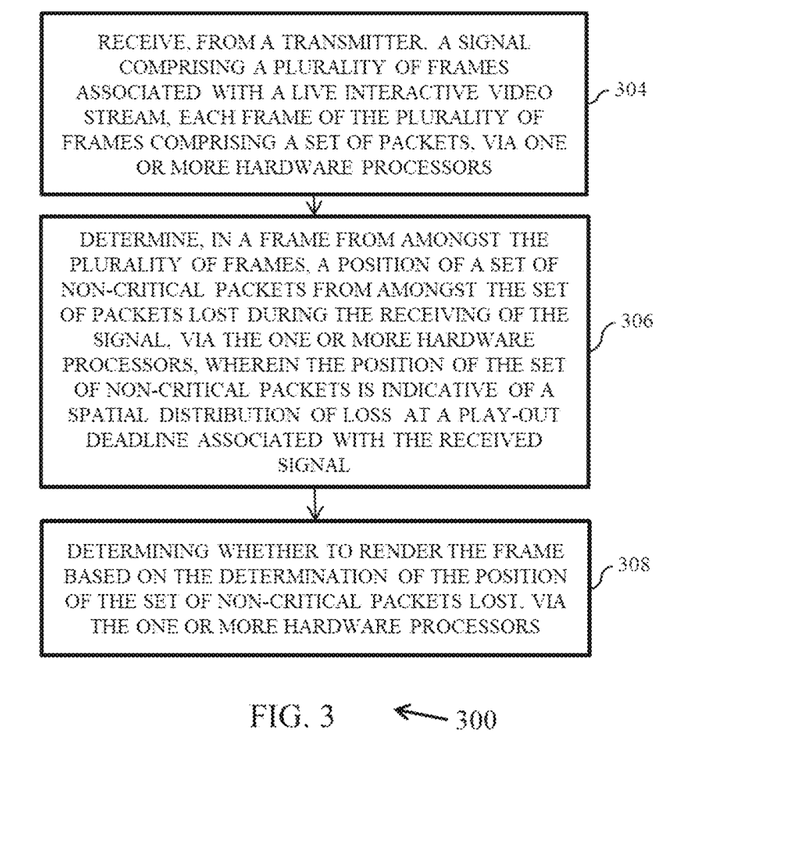
FIG. 3 illustrates a flow diagram of a method for enhancing QoE of video reception at a receiver in accordance with some embodiments of the present disclosure.

FIG. 3 is an exemplary flow diagram illustrating a computer implemented method for enhancing QoE of video reception at receiver (or video consumer 130, FIG. 1) in accordance with an embodiment of the present disclosure. The steps of the method 300 will now be explained in detail with reference to the components of the system 100 (of FIG. 1) and system 200 (of FIG. 2) and FIGS. 3 through 6. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Herein, the objective is to increase the rate of frame reception such that the remote observer should be able to gracefully infer the scene despite potential losses in a frame. If the losses happen towards the end of the frame, then the visual effect is minimal. So, we can allow losses within the last threshold (K) % of the total packets. The exact value of K is application specific. So, we need an exact distribution of losses in the frame. This can be done through the Position and Time-stamp headers only when the last packet in the frame is successfully received. However, since all non-critical packets, including the last packet, are transmitted using best-effort semantics, this estimation is not guaranteed in the conventional A-REaLiST.

The way MJPEG is transmitted on A-REaLiST, the last-segment indicator actually is redundant in its present interpretation because the payload of the last segment itself carries an End-of-Image (EoI) marker. Also, since the first packet carries the meta-data and is always transmitted in a blocking fashion with stop-and-wait reliability, the zero offset value is also not required. Accordingly, in various embodiments, the interpretation of subfields in Position indicator is modified. The last bit in the first critical packet is set and the offset sub-field is loaded with the offset of the last possible packet in that frame. This way, the receiver has first-hand information on the expected number of packets. Thus, at the play-out deadline, the receiver is able to identify the loss distribution in the frame even if the last segment fails to reach the receiver. A method for enhancing QoE of video reception at the receiver is described further in the description below.

At 302, the receiver receives a signal comprising a plurality of frames associated with the live interactive video stream such that each frame of the plurality of frames includes a set of packets. The signal includes a plurality of packets having a maximum size limited by a maximum transmission unit (MTU) associated with an underlying network of transmission. It is to be noted that, the interpretation of the subfields in Position indicator is modified (as compared to the interpretation of the position indication in A-REaLiST).

At 304, method 300 includes determining, in a frame from amongst the plurality of frames, a position of a set of non-critical packets from amongst the set of packets lost on receiving of the signal. Herein, the position of the set of non-critical packets is indicative of a distribution of spatial distribution of loss at a play-out deadline associated with the received signal. The method for determination of the spatial distribution of loss is described further with reference to FIG. 4 below.

Figure 4:
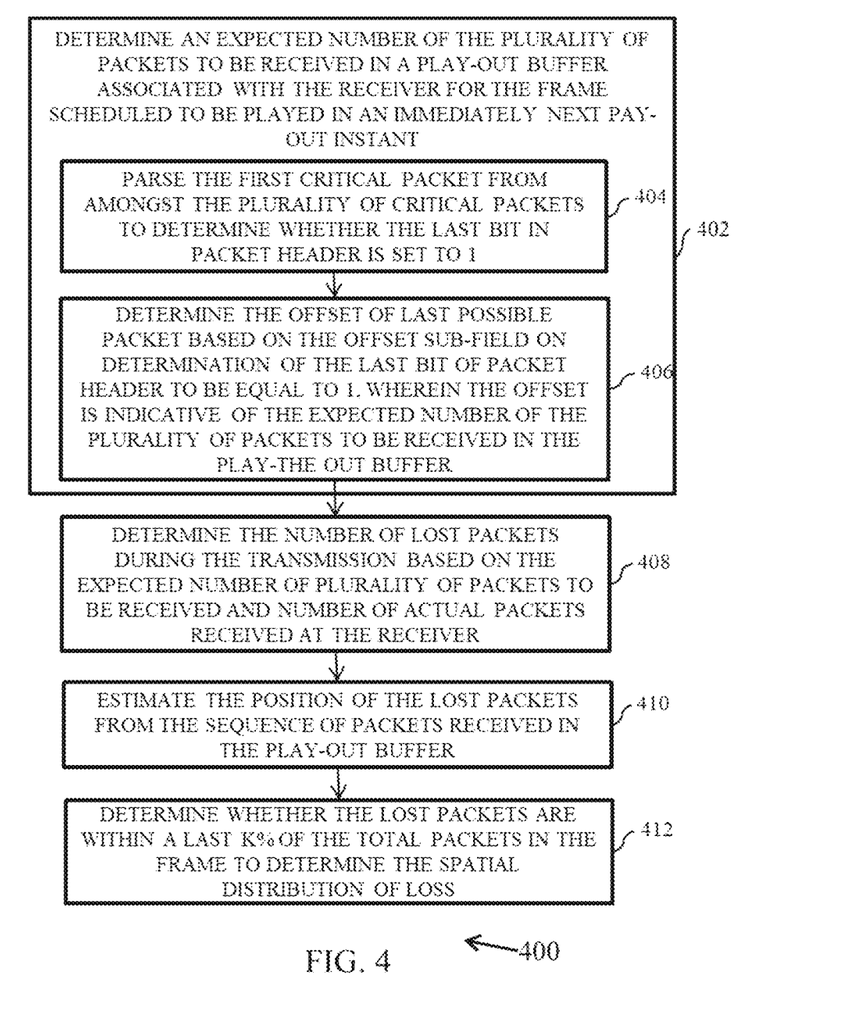
FIG. 4 is illustrate a flow diagram of a method for determining spatial distribution of loss for enhancing QoE of video reception at a receiver according to some embodiments of the present disclosure.

Referring to FIG. 4, a method 400 for determination of the spatial distribution of loss is described in accordance with an example embodiment. At 402, the position of the set non-critical packets that are lost is determined by determining an expected number of the plurality of packets to be received in a play-out buffer for the frame that is scheduled to be played in an immediately next pay-out instant at 402.

In an embodiment, the expected number of the plurality of packets to be received in the play-out buffer associated with the receiver is determined by parsing the first critical packet from amongst the plurality of critical packets to determine whether the last bit in packet header is set to 1, at 404. On determination of the last bit of packet header to be equal to 1, the Offset of last possible packet is determined based on the Offset sub-field, at 406. Herein, the offset is indicative of the expected number of the plurality of packets to be received in the play-the out buffer.

Based on the expected number of plurality of packets to be received and number of actual packets received at the receiver, the number of packets during the transmission is determined at 408. If the packets are lost towards the end of the frame, then such loss does not impact the visual experience much. Hence, at the play-out boundary for a given time-stamp, the disclosed system determines the distribution of the lost packets in the frame corresponding to that time-stamp. The position of the lost packets is estimated from the sequence of packets received in the play-out buffer at 410. It is further determined whether the lost non-critical packets are within a last K % of the total packets in the frame to determine the spatial distribution of loss at 412.

Referring back to FIG. 3, on determination of the position of the set of non-critical packets that are lost during transmission, it is further determined at 306 whether to render the frame. For example, if the position of the one or more non-critical packets is determined to be within a threshold (K) % of total non-critical packets in that frame, then said frame is rendered by a rendering unit (at the receiver end). If however, the position of the one or more non-critical packets is not determined to be within the threshold (K) % of total non-critical packets in that frame, then the frame is dropped from rendering at the receiver end. In an embodiment, in this scenario, the previous uncorrupted frame is played-out. If at 412, it is determined that the lost non-critical packets are not within the last K % of the total packets in the frame, then the frame may be rendered as per A-REaLiST protocol.

Herein, it will be understood that the value of K may be provided as a user input depending on the application employing the disclosed system and method. Determining the value of K may lead to several candidate methods based on the context of scene, encoding of the video, user recommendation, and so on. In an embodiment, the configuration parameter set by an end-user simply based on heuristics or trial and error. However, in a smart system K should be derivable from some more deterministic configuration parameters. An exemplary scenario for determination of K is described further in the description below with reference to FIGS. 5A and 5B.

Figure 5A:
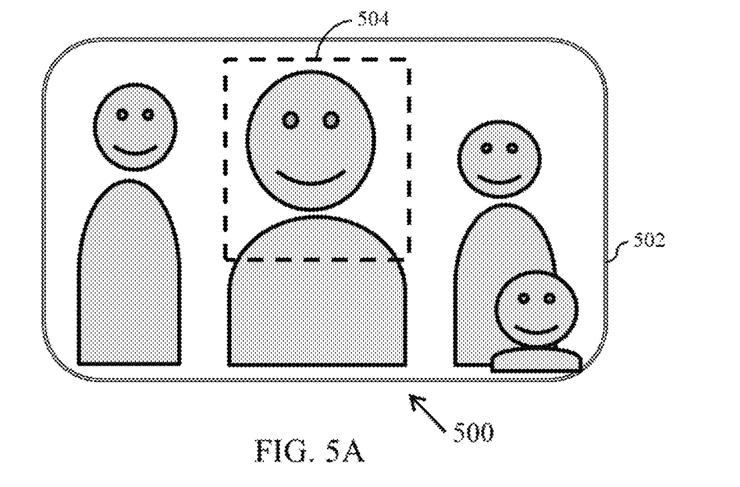
FIGS. 5A and 5B illustrate an example scenario for determination of value of K for enhancing QoE of video reception at a receiver in accordance with some embodiments of the present disclosure.
Figure 5B:
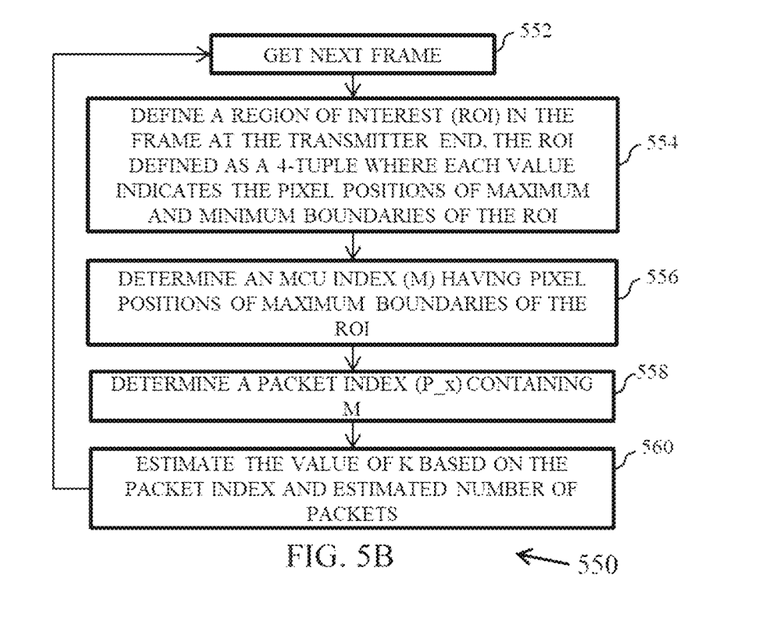

FIGS. 5A and 5B illustrate an example scenario for determination of value of K, in accordance with an example embodiment. Based on the context of a live scene, a user may define a region of interest (RoI) within a viewing area. An example scene in a device 500 is depicted in FIG. 5A, where a frame 502 is shown to include three humans. In an example embodiment, the user may mark the RoI 504 in the depicted scene (for example, on the device) either through a touch-screen interface or through any other mechanism interfacing with the visual display unit like the mouse-pointer, and so on. For example, in an interactive video chat application, the user may mark the area around the face of the remote speaker in the visual display unit. RoI determination may also be done by some automatic sensing of eye-gaze and translating that to pixels boundaries of the RoI. As one of the possible approaches, the RoI may even be fixed around a specific square circumference around the centre of the frame at the transmitter end itself.

In an embodiment, the value of K may be determined based on the RoI, as described further with reference to the flow chart depicted in FIG. 5B.

At 552 of method 500, a RoI (for example the RoI 504) is defined in the frame (for example, the frame 502) at the transmitter end. The RoI may be defined as a 4-tuple where each value indicates the pixel positions of maximum and minimum boundaries of the RoI.

For example, let R be the RoI defined as a 4-tuple where each value indicates the pixel positions: $\{R_{x\_min}, R_{x\_max}, R_{y\_min}, R_{y\_max}\}$ The maximum boundary of RoI is $R_{max} = (R_{x\_max}, R_{y\_max})$ At 554, an MCU index (M) is determined for each frame having pixel positions of maximum boundaries of the RoI. At 556, a packet index ($P_x$) having the MCU index is defined. At 558, the value of K is estimated based on the packet index and estimated number of packets as defined in the expression below:

$$K = (P - (P_x + 1))/P$$

Figure 6:
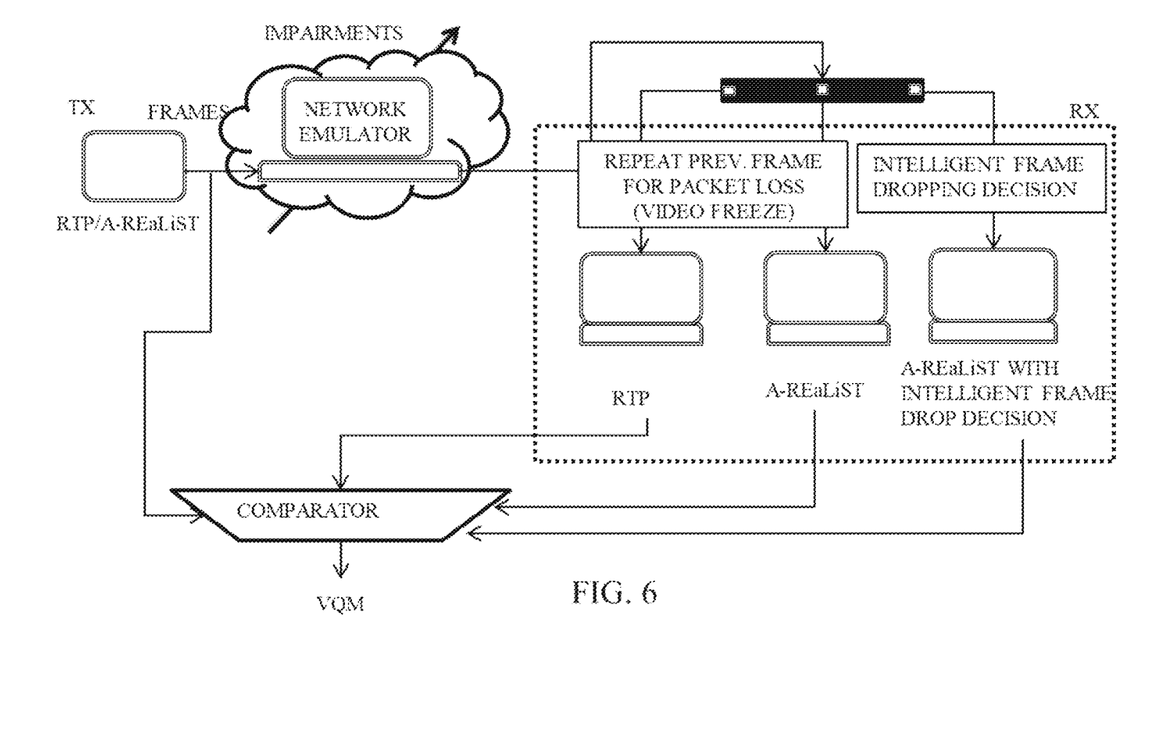
FIG. 6 illustrate an example experimental set-up for testing efficacy of proposed method and system of FIGS. 2-5B in accordance with some embodiments of the present disclosure.
Figure 7:
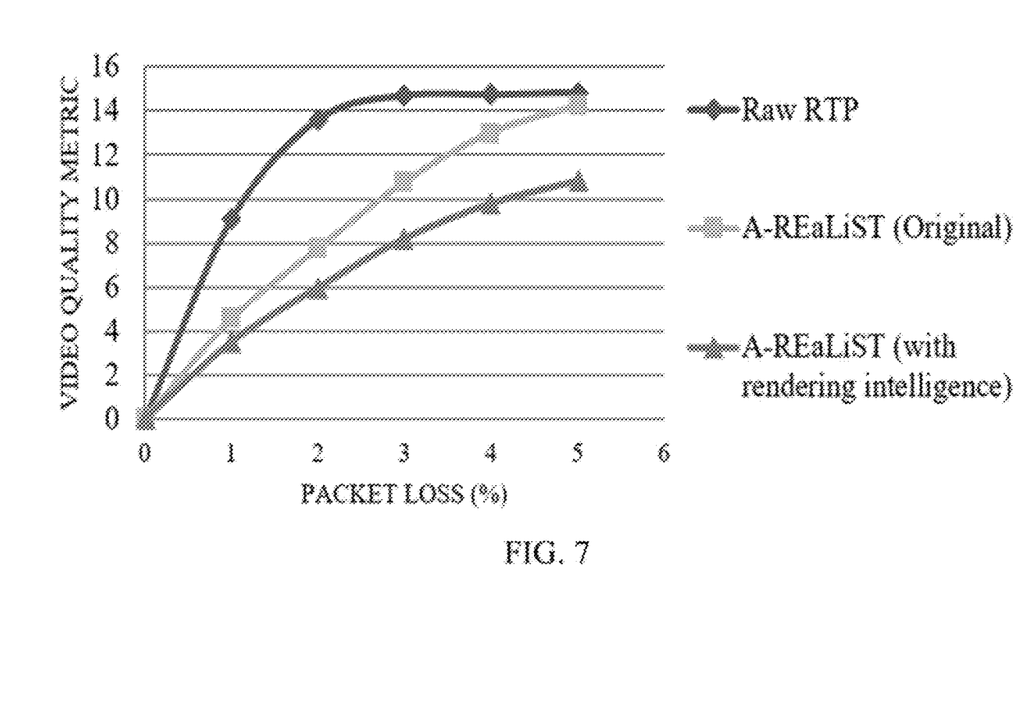
FIG. 7 illustrate variation between video quality metric and percentage packet loss for standard RTP, raw A-REaLiST and A-REaLiST with the modification, in accordance with an example embodiment.

An experimental scenario for enhancing QoS at the reception is described further with reference to FIGS. 6 and 7.

Example Scenario:

FIG. 6 illustrates a block diagram for an experimental setup in accordance with an example embodiment. The performance is measured in terms of the standard Video Quality Metric (VQM) for the popularly known Foreman sequence. The benchmarking is performed between standard RTP, raw A-REaLiST and A-REaLiST with the modification. Herein the term 'A-REaLiST with the modification' refers to the modified A-REaLiST as described with reference to the disclosed embodiments. The end-to-end connection was set up through a network emulator and different packet loss were introduced through the emulator.

FIG. 7 illustrates a variation between video quality metric and percentage packet loss for standard RTP, raw A-REaLiST and A-REaLiST with the modification, in accordance with an example embodiment. As illustrated in FIG. 7, the disclosed modifications (described with reference to FIGS. 2-5B) yields better VQM amongst the systems under test. Please note that a lower value of VQM yields better result.

Various embodiments disclose method and system for enhancing QoE for rendering live interactive videos in real-time. The conventional methods utilizes an additional field in packet header to determine which packet sequences were lost, so that the receiver could request a retransmission. Due to unpredictable delay and loss, the receiver may not get the end-of-frame packet which has been sent using best-effort. The disclosed method and system introduced an additional indicator to identify an expected maximum number of packets transmitted for each frame, and further determine the distribution of loss so that the rendering unit can intelligently decide on whether to allow the frame to display, or to drop it without using any additional retransmission or error-concealment strategy, thereby enhancing the QoE of reception at the receiver.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for enhancing Quality of experience (QoE) of video reception at a receiver, comprising:
   receiving, from a transmitter, a signal comprising a plurality of frames associated with a live interactive video stream, each frame of the plurality of frames comprising a set of packets, via one or more hardware processors;
   determining, in a frame from amongst the plurality of frames, a position of a set of non-critical packets from amongst the set of packets lost during the receiving of the signal, via the one or more hardware processors, wherein the position of the set of non-critical packets is indicative of a spatial distribution of loss at a play-out deadline associated with the received signal; and
   determining whether to render the frame based on the determination of the position of the set of non-critical packets lost, via the one or more hardware processors;
   wherein the signal comprises a plurality of packets having a maximum size limited by a maximum transmission unit (MTU) associated with an underlying network of transmission;
   wherein each packet of the plurality of packets is characterized based on a criticality for rendering, by identifying the each packet as one of a critical packet and a non-critical packet, wherein the plurality of packets are transmitted as REpresentational State Transfer (RESTful) requests;
   wherein transmitting the plurality of packets as the RESTful requests comprises utilizing Constrained Application Protocol (CoAP) with header options including:
   Stream info being a request option and a response option having one or more Least Significant Bits (LSBs) indicating a state of exchange (stream state) and one or more Most Significant Bits (MSBs) indicating an identifier (stream id) for the streaming media;
   Timestamp being a request option relating to the plurality of packets to a corresponding frame in a play sequence of the streaming media; and
   Position being a request option having one or more MSBs indicating an offset at which a current packet is placed in a frame corresponding to an associated timestamp and one or more LSBs indicating whether the current packet contains information about the last possible offset for the present frame with given timestamp, and wherein for a first critical packet of the frame, a last-bit is set as 1 and the Offset sub-field is loaded with the Offset of last possible packet in the frame.

2. The processor implemented method of claim 1, wherein determining the spatial distribution of loss comprises:
   determining an expected number of the plurality of packets to be received in a play-out buffer associated with the receiver for the frame scheduled to be played in an immediately next pay-out instant;
   determining the number of lost packets during the transmission based on the expected number of plurality of packets to be received and number of actual packets received at the receiver;
   estimating the position of the lost packets from the sequence of packets received in the play-out buffer; and
   determining whether the lost packets within a last threshold (K) % of the total packets in the frame to determine the spatial distribution of loss.

3. The processor implemented method of claim 1, wherein determining the expected number of the plurality of packets to be received in the play-out buffer associated with the receiver comprises:
   parsing the first critical packet from amongst the plurality of critical packets to determine whether the last bit in packet header is set to 1;
   determining the Offset of last possible packet based on the Offset sub-field on determination of the last bit of packet header to be equal to 1, wherein the offset is indicative of the expected number of the plurality of packets to be received in the play-out buffer.

4. The processor implemented method of claim 2, further comprising determining value of the threshold (K), wherein determining the value of the threshold (K) comprises:
   defining a region of interest (ROI) in the frame at the transmitter end, the ROI defined as a 4-tuple where each value indicates the pixel positions of maximum and minimum boundaries of the ROI;
   for each frame, determine an MCU index (M) having pixel positions of maximum boundaries of the ROI;
   determining a packet index (P_x) having the MCU index; and
   estimating the value of K based on the packet index and estimated number of packets.

5. A system for enhancing Quality of experience (QoE) of video reception at a receiver, comprising:
   a memory storing instructions;
   one or more communication interfaces; and
   one or more hardware processors coupled to the memory via the one or more communication interfaces, wherein the one or more hardware processors are configured by the instructions to:
receive, from a transmitter, a signal comprising a plurality of frames associated with a live interactive video stream, each frame of the plurality of frames comprising a set of packets;
determine, in a frame from amongst the plurality of frames, a position of a set of non-critical packets from amongst the set of packets lost during the receiving of the signal, wherein the position of the set of non-critical packets is indicative of a spatial distribution of loss at a play-out deadline associated with the received signal; and
determine whether to render the frame based on the determination of the position of the set of non-critical packets lost:
wherein the signal comprises a plurality of packets having a maximum size limited by a maximum transmission unit (MTU) associated with an underlying network of transmission;
wherein each packet of the plurality of packets is characterized based on a criticality for rendering, by identifying the each packet as one of a critical packet and a non-critical packet, wherein the plurality of packets are transmitted as REpresentational State Transfer (RESTful) requests;
wherein to transmit the plurality of packets as the RESTful requests, the one or more hardware processors are configured by the instructions to utilize Constrained Application Protocol (CoAP) with header options including:
Stream info being a request option and a response option having one or more Least Significant Bits (LSBs) indicating a state of exchange (stream state) and one or more Most Significant Bits (MSBs) indicating an identifier (stream id) for the streaming media:
Timestamp being a request option relating to the plurality of packets to a corresponding frame in a play sequence of the streaming media; and
Position being a request option having one or more MSBs indicating an offset at which a current packet is placed in a frame corresponding to an associated timestamp and one or more LSBs indicating whether the current packet contains information about the last possible offset for the present frame with given timestamp, and wherein for a first critical packet of the frame, a last-bit is set as 1 and the Offset sub-field is loaded with the Offset of last possible packet in the frame.

6. The system of claim 5, wherein to determine the spatial distribution of loss, the one or more hardware processors are configured by the instructions to:
determine an expected number of the plurality of packets to be received in a play-out buffer associated with the receiver for the frame scheduled to be played in an immediately next pay-out instant;
determine the number of lost packets during the transmission based on the expected number of plurality of packets to be received and number of actual packets received at the receiver;
estimate the position of the lost packets from the sequence of packets received in the play-out buffer; and
determine whether the lost packets within a last threshold (K) % of the total packets in the frame to determine the spatial distribution of loss.

7. The system of claim 5, wherein to determine the expected number of the plurality of packets to be received in the play-out buffer associated with the receiver, the one or more hardware processors are configured by the instructions to:
parse the first critical packet from amongst the plurality of critical packets to determine whether the last bit in packet header is set to 1;
determine the Offset of last possible packet based on the Offset sub-field on determination of the last bit of packet header to be equal to 1, wherein the offset is indicative of the expected number of the plurality of packets to be received in the play-out buffer.

8. The system of claim 7, wherein the one or more hardware processors are further configured by the instruction to determine value of the threshold (K), wherein to determine the value of the threshold (K), the one or more hardware processors are further configured by the instructions to:
define a region of interest (ROI) in the frame at the transmitter end, the ROI defined as a 4-tuple where each value indicates the pixel positions of maximum and minimum boundaries of the ROI;
for each frame, determine an MCU index (M) having pixel positions of maximum boundaries of the ROI;
determine a packet index (P_x) having M; and
estimate the value of K based on the packet index and estimated number of packets.

9. One or more non-transitory machine readable information storage mediums comprising one or more instructions which when executed by one or more hardware processors cause a method for enhancing Quality of experience (QoE) of video reception at a receiver, the method comprising:
receiving, from a transmitter, a signal comprising a plurality of frames associated with a live interactive video stream, each frame of the plurality of frames comprising a set of packets, via one or more hardware processors;
determining, in a frame from amongst the plurality of frames, a position of a set of non-critical packets from amongst the set of packets lost during the receiving of the signal, via the one or more hardware processors, wherein the position of the set of non-critical packets is indicative of a spatial distribution of loss at a play-out deadline associated with the received signal; and
determining whether to render the frame based on the determination of the position of the set of non-critical packets lost, via the one or more hardware processors;
wherein the signal comprises a plurality of packets having a maximum size limited by a maximum transmission unit (MTU) associated with an underlying network of transmission;
wherein each packet of the plurality of packets is characterized based on a criticality for rendering, by identifying the each packet as one of a critical packet and a non-critical packet, wherein the plurality of packets are transmitted as REpresentational State Transfer (RESTful) requests;
wherein transmitting the plurality of packets as the RESTful requests comprises utilizing Constrained Application Protocol (CoAP) with header options including:
Stream info being a request option and a response option having one or more Least Significant Bits (LSBs) indicating a state of exchange (stream state) and one or more Most Significant Bits (MSBs) indicating an identifier (stream id) for the streaming media;
Timestamp being a request option relating to the plurality of packets to a corresponding frame in a play sequence of the streaming media; and Position being a request option having one or more MSBs indicating an offset at which a current packet is placed in a frame corresponding to an associated timestamp and one or more LSBs indicating whether the current packet contains information about the last possible offset for the present frame with given timestamp, and wherein for a first critical packet of the frame, a last-bit is set as 1 and the Offset sub-field is loaded with the Offset of last possible packet in the frame.

* * * * *